United States Patent
Yajima et al.

(10) Patent No.: US 12,436,207 B2
(45) Date of Patent: Oct. 7, 2025

(54) SENSOR OUTPUT COMPENSATION CIRCUIT

(71) Applicant: Murata Manufacturing Co., Ltd., Nagaokakyo (JP)

(72) Inventors: Aritsugu Yajima, Nagaokakyo (JP); Tetsuya Narita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 179 days.

(21) Appl. No.: 18/368,175

(22) Filed: Sep. 14, 2023

(65) Prior Publication Data

US 2024/0003992 A1   Jan. 4, 2024

Related U.S. Application Data

(63) Continuation of application No. PCT/JP2022/010726, filed on Mar. 10, 2022.

(30) Foreign Application Priority Data

Mar. 31, 2021 (JP) .................... 2021-061404
Apr. 1, 2021 (JP) .................... 2021-063118

(51) Int. Cl.
   *G01R 33/00* (2006.01)
   *G01R 33/09* (2006.01)
(52) U.S. Cl.
   CPC ..... *G01R 33/0082* (2013.01); *G01R 33/0029* (2013.01); *G01R 33/098* (2013.01)
(58) Field of Classification Search
   CPC ............ G01R 33/0082; G01R 33/0029; G01R 33/098

(Continued)

(56) References Cited

U.S. PATENT DOCUMENTS 4,152,659 A * 5/1979 Gordon ..................... H03F 3/45
                                                                330/108
4,611,163 A   9/1986 Madeley
(Continued)

FOREIGN PATENT DOCUMENTS

JP   63202978 A   8/1988
JP   02210272 A   8/1990
(Continued)

OTHER PUBLICATIONS

Translation of JPH 08233867 (Year: 1996).*
(Continued)

*Primary Examiner* — Christopher P McAndrew
(74) *Attorney, Agent, or Firm* — Keating & Bennett, LLP

(57) ABSTRACT

A sensor output compensation circuit includes a differential amplifier circuit to amplify, as a sensor output, a differential voltage between detection voltages measured in two detection signal output terminals of a sensor including a sensor element that has a resistance value that changes depending on a detected physical quantity and that is connected by bridge connection, a temperature sensor circuit to detect an ambient temperature, and a temperature coefficient sensitivity compensation circuit to apply, to two power terminals of the sensor, a bias voltage to cancel a variation in sensitivity of the sensor output as the ambient temperature changes, based on the ambient temperature that is detected by the temperature sensor circuit.

17 Claims, 9 Drawing Sheets

(58) Field of Classification Search
USPC .......................................................... 324/244
See application file for complete search history.

(56) References Cited

U.S. PATENT DOCUMENTS

| | | | |
|---|---|---|---|
| 4,658,855 A | 4/1987 | Doyle | |
| 5,024,101 A | 6/1991 | Tanaka et al. | |
| 5,686,826 A | 11/1997 | Kurtz et al. | |
| 6,829,158 B2* | 12/2004 | Naji | G11C 11/5607 365/158 |
| 2007/0211362 A1* | 9/2007 | Li | G11B 20/10194 |
| 2010/0052664 A1 | 3/2010 | Nishizawa et al. | |
| 2010/0141251 A1* | 6/2010 | Ando | G01R 33/093 324/252 |
| 2013/0314075 A1* | 11/2013 | Ausserlechner | G01R 33/07 73/1.01 |
| 2018/0188294 A1 | 7/2018 | Kawanami | |
| 2019/0339337 A1* | 11/2019 | Sharma | G01R 33/098 |
| 2020/0191547 A1* | 6/2020 | Watanabe | G01R 33/09 |
| 2021/0063506 A1* | 3/2021 | Wang | G11B 5/3929 |

FOREIGN PATENT DOCUMENTS

| | | |
|---|---|---|
| JP | 02236184 A | 9/1990 |
| JP | 08194040 A | 7/1996 |
| JP | 08233867 A | 9/1996 |
| JP | H1038611 A | 2/1998 |
| JP | 11194160 A | 7/1999 |
| JP | 2005337861 A | 12/2005 |
| JP | 2006194837 A | 7/2006 |
| JP | 2009047478 A | 3/2009 |
| JP | 2015154349 A | 8/2015 |
| JP | 2017227450 A | 12/2017 |
| WO | 2008130002 A1 | 10/2008 |
| WO | 2017061206 A1 | 4/2017 |
| WO | 2019069499 A1 | 4/2019 |

OTHER PUBLICATIONS

Translation of JP 2017227450 (Year: 2017).*
International Search Report in PCT/JP2022/010726, mailed May 24, 2022, 4 pages.
Written Opinion in PCT/JP2022/010726, mailed May 24, 2022, 3 pages.

* cited by examiner $y = -6.469E-07x^3 - 1.512E-06x^2 + 2.175E-02x + 4.306E-03$

SENSOR OUTPUT COMPENSATION CIRCUIT

CROSS REFERENCE TO RELATED APPLICATIONS

This application claims the benefit of priority to Japanese Patent Application No. 2021-063118 filed on Apr. 1, 2021 and Japanese Patent Application No. 2021-061404 filed on Mar. 31, 2021, and is a Continuation Application of PCT Application No. PCT/JP2022/010726 filed on Mar. 10, 2022. The entire contents of each application are hereby incorporated herein by reference.

BACKGROUND OF THE INVENTION

1. Field of the Invention

The present invention relates to a sensor output compensation circuit to adjust the sensitivity of the output of a sensor that includes a sensor element connected by bridge connection.

2. Description of the Related Art

An existing sensor output compensation circuit of this kind relates to, for example, a magnetoresistive element amplifier circuit disclosed in Japanese Unexamined Patent Application Publication No. 11-194160.

The magnetoresistive element amplifier circuit includes a magnetoresistive element in which four strong magnetoresistive element patterns are connected by bridge connection and performs differential amplification of the output voltage of the magnetoresistive element by connecting a differential amplifier circuit to two output terminals of the magnetoresistive element. The differential amplifier circuit includes an offset adjustment circuit that makes the midpoint potential of the amplified output voltage variable and that sets the midpoint potential to a predetermined potential by using a variable resistor. At a subsequent position, a temperature compensation circuit that adjusts a variation in the amplitude of the output voltage due to a change in temperature is provided as a sensor output compensation circuit.

However, the existing temperature compensation circuit disclosed in Japanese Unexamined Patent Application Publication No. 11-194160 uses a thermistor element for a temperature compensation resistor and can accordingly provide only temperature compensation depending on thermistor characteristics. For this reason, a temperature range in which the temperature compensation can be provided is limited, sensitivity compensation with respect to a wider range of a temperature variation cannot be provided, and accordingly, the sensitivity temperature compensation of the sensor output is limited. Since the characteristics of the thermistor element vary, temperature compensation characteristics accordingly vary due to the variation, and this poses a problem for increasing the precision of the temperature compensation. The use of the thermistor element for the temperature compensation circuit makes it difficult to provide the temperature compensation circuit as an IC (high integration) and makes the temperature compensation circuit difficult to reduce the size and cost.

SUMMARY OF THE INVENTION

Preferred embodiments of the present invention provide sensor output compensation circuits that are each able to uniformly provide sensitivity temperature compensation of a sensor output with precision in all temperature regions and reduce the size and cost of the circuit.

A sensor output compensation circuit according to a preferred embodiment of the present invention includes a differential amplifier circuit to amplify, as a sensor output, a differential voltage between detection voltages measured in two detection signal output terminals of a sensor including a sensor element that has a resistance value that changes depending on a detected physical quantity and that is connected by a bridge connection, a temperature sensor circuit to detect ambient temperature, and a temperature coefficient sensitivity compensation circuit to apply, to two power terminals of the sensor, a bias voltage to cancel a variation in sensitivity of the sensor output as the ambient temperature changes, based on the ambient temperature that is detected by the temperature sensor circuit.

With this structure, the variation in the sensitivity of the sensor output as the ambient temperature changes is canceled and adjusted in a manner in which the temperature coefficient sensitivity compensation circuit applies the bias voltage to cancel the variation to the two power terminals of the sensor. Accordingly, unlike the existing temperature compensation circuit that is disclosed in Japanese Unexamined Patent Application Publication No. 11-194160 and that provides only the temperature compensation depending on the thermistor characteristics, a temperature range in which the temperature compensation can be provided is not limited. In addition, temperature compensation characteristics do not vary due to a thermistor element unlike existing cases. For this reason, sensitivity temperature compensation can be uniformly provided with precision in all temperature regions. The sensor output compensation circuit can be provided without using a thermistor element for a temperature compensation circuit. Accordingly, the sensor output compensation circuit can be provided as an IC, and the size and cost of the sensor output compensation circuit can be reduced.

For this reason, preferred embodiments of the present invention provide sensor output compensation circuits that are each able to uniformly provide the sensitivity temperature compensation of a sensor output with precision in all temperature regions and that reduce the size and cost of the circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Sensor output compensation circuits according to preferred embodiments of the present invention will now be described with reference to the drawings.

Figure 1:
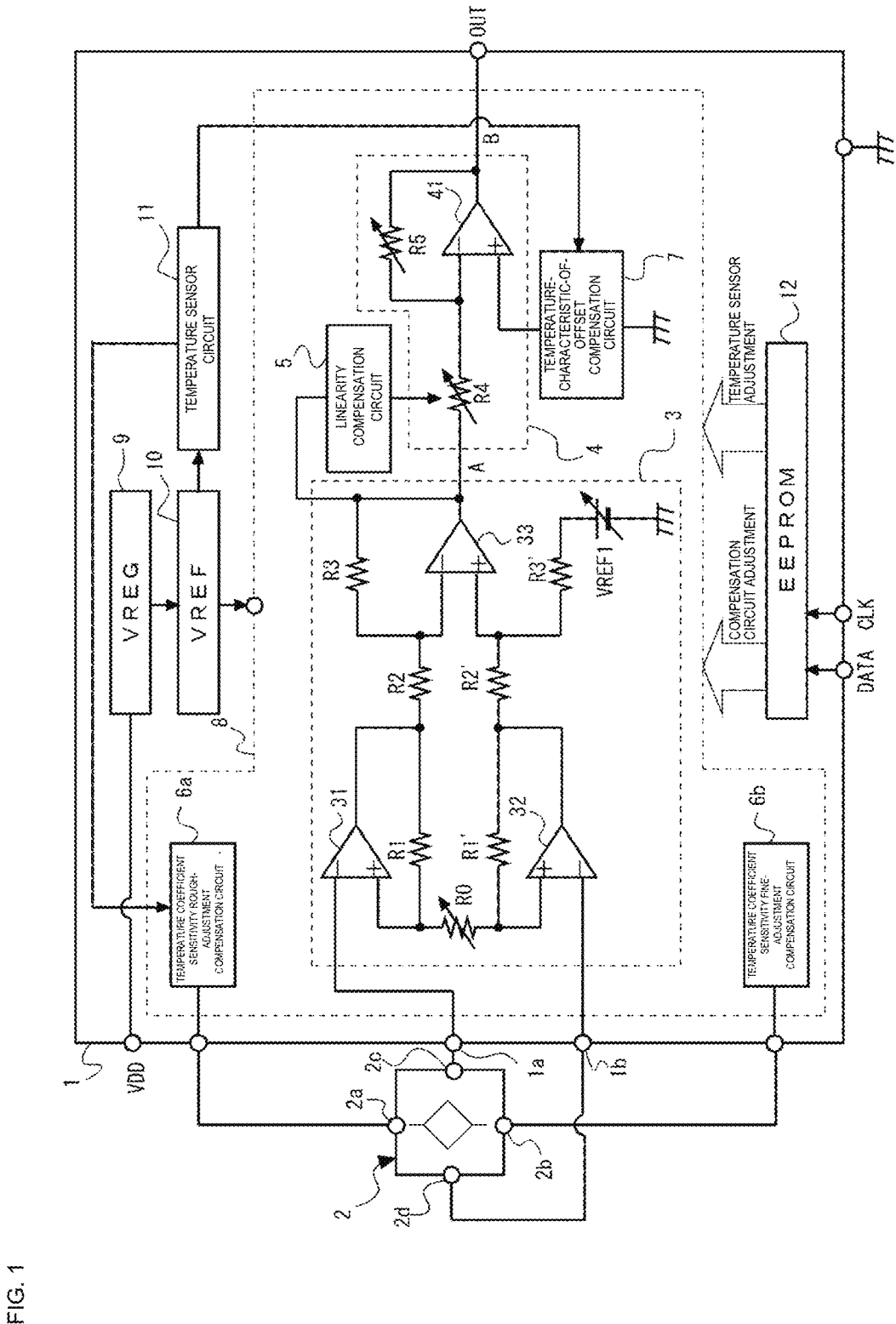
FIG. 1 is a circuit diagram illustrating a configuration of an entire sensor output compensation circuit according to a preferred embodiment of the present invention.

FIG. 1 is a circuit diagram illustrating a schematic configuration of the whole of a sensor output compensation circuit according to a preferred embodiment of the present invention.

The sensor output compensation circuit receives the output of a TMR (Tunneling Magneto-Resistive) sensor 2, compensates a sensor output in various ways, and is provided as an IC corresponding to a sensor output compensation IC 1. As for the TMR sensor 2, a TMR element the resistance value of which changes depending on a magnetic field that is a physical quantity to be detected is connected by bridge connection, a predetermined voltage is applied to two power terminals 2a and 2b for operation. The magnetic field that is detected by the TMR sensor 2 is measured as a voltage difference between two detection signal output terminals 2c and 2d, which is applied as the sensor output to signal input terminals 1a and 1b of the sensor output compensation IC 1. The TMR sensor 2 is used, for example, to monitor an electric current that is supplied to a motor of a hybrid vehicle.

Various kinds of compensation provided by the sensor output compensation IC 1 include linearity compensation for the sensor output, sensitivity compensation, temperature coefficient sensitivity (TCS) compensation, offset compensation, and temperature-characteristic-of-offset (TCO) compensation. Compensation concerning variations in these kinds of compensation due to the TMR sensor 2 is also included.

The linearity compensation is compensation to remove a nonlinearity component from the sensor output and guaranteeing the linearity of the sensor output. The offset compensation is compensation to cancel out the offset voltage that is measured in the two detection signal output terminals 2c and 2d when the TMR sensor 2 detects no magnetic field. The temperature-characteristic-of-offset compensation is compensation to cancel out a temperature variation in the offset voltage. The sensitivity compensation is compensation to cancel out a variation in the sensitivity of the TMR sensor 2 due to the TMR sensor 2. The sensitivity of the TMR sensor 2 is obtained by dividing, by a rated magnetic field, an output span voltage that is obtained by subtracting the offset voltage from the rated output voltage of the sensor output compensation IC 1 and means a change in output voltage per unit magnetic field. The temperature coefficient sensitivity compensation is compensation to cancel out a temperature variation in temperature coefficient sensitivity that represents what degree the output span voltage changes at maximum at compensation temperature.

The sensor output compensation IC 1 includes a differential amplifier circuit 3 that includes an instrumentation amplifier and a compensation amplifier circuit 4 that adjusts the output of the differential amplifier circuit 3. The differential amplifier circuit 3 includes operational amplifiers 31 and 32 that amplify detection voltages that are measured in two detection signal output terminals 2c and 2d of the TMR sensor 2 and an operational amplifier 33 that performs the differential amplification of the amplified detection voltages. A differential voltage between the detection voltages that are measured in the two detection signal output terminals 2c and 2d is dealt with as a substantial sensor output. The differential amplifier circuit 3 outputs an output A that is obtained by amplifying the sensor output with an amplification factor α expressed as the following expression (1):

$$\alpha = (R3/R2) \times \{1 + (2 \times R1)/R0\}, \quad (1)$$

where R1=R1', R2=R2', and R3=R3' are satisfied, R0 is a variable resistor, and R0, R1, R2, R3, R1', R2', and R3' are resistance values and resistors that are connected to the operational amplifiers 31 to 33 as illustrated.

The sensitivity of the sensor output is adjusted in a manner in which the variable resistor R0 is made variable, and a variation therein due to the TMR sensor 2 is compensated for. A variable voltage source VREF1 is connected to a non-inverting input terminal of the operational amplifier 33 with the resistor R3' interposed therebetween. The offset voltage of the sensor output is adjusted in a manner in which the output voltage of the variable voltage source VREF1 is made variable and is adjusted such that an output voltage VOUT that is measured in an output terminal OUT of the sensor output compensation IC 1 is zero or approximately zero when the TMR sensor 2 detects no magnetic field.

The compensation amplifier circuit 4 includes an operational amplifier 41 to which a variable resistor R4 and a variable resistor R5 are connected and outputs, as the output voltage VOUT, an output B that is obtained by the inverting amplification of the output A of the differential amplifier circuit 3 to the output terminal OUT of the sensor output compensation IC 1. As a result, the sensor output is amplified with an amplification factor β expressed as the following expression (2):

$$\beta = \alpha \times (R5/R4) = (R3/R2) \times \{1 + (2 \times R1)/R0\} \times (R5/R4). \quad (2)$$

An amplification factor (R5/R4) of the compensation amplifier circuit 4 changes when the resistance value of the variable resistor R4 or R5 to be connected is changed. According to the present preferred embodiment, the resistance values of the variable resistors R4 and R5 are made variable in a manner in which connections between multiple resistors, not illustrated, are switched by multiple switches, not illustrated, and the combined resistance value of the multiple resistors is changed.

The sensor output compensation IC 1 according to the present preferred embodiment includes a linearity compensation circuit 5 that adjusts the linearity of the sensor output, a temperature coefficient sensitivity compensation circuit that adjusts the temperature coefficient sensitivity of the sensor output, and a temperature-characteristic-of-offset compensation circuit 7 that adjusts the temperature characteristics of the offset voltage of the sensor output. According to the present preferred embodiment, the temperature coefficient sensitivity compensation circuit includes a temperature coefficient sensitivity rough-adjustment compensation circuit 6a and a temperature coefficient sensitivity fine-adjustment compensation circuit 6b. The differential amplifier circuit 3, the compensation amplifier circuit 4, the linearity compensation circuit 5, the temperature coefficient sensitivity rough-adjustment compensation circuit 6a, the temperature coefficient sensitivity fine-adjustment compensation circuit 6b, and the temperature-characteristic-of-offset compensation circuit 7 are included in a compensation block 8 of the sensor output compensation IC 1.

The sensor output compensation IC 1 also includes a regulator circuit (VREG) 9, a reference voltage circuit (VREF) 10, and a temperature sensor circuit 11. The regulator circuit 9 generates a standard voltage from a voltage that is applied to a power terminal VDD. The reference voltage circuit 10 generates reference voltages that are used in, for example, the temperature coefficient sensitivity rough-adjustment compensation circuit 6a, the temperature coefficient sensitivity fine-adjustment compensation circuit 6b, and the temperature-characteristic-of-offset compensation circuit 7 from the standard voltage that is generated by the regulator circuit 9. The temperature sensor circuit 11 detects ambient temperature as a voltage by using a diode and outputs detected voltage conversion temperature to the temperature coefficient sensitivity rough-adjustment compensation circuit 6a and the temperature-characteristic-of-offset compensation circuit 7. The TMR sensor 2 and the sensor output compensation IC 1 are adjacent to each other, and accordingly, the ambient temperature that is detected by the temperature sensor circuit 11 is detected as the ambient temperature of the TMR sensor 2.

The sensor output compensation IC 1 also includes an EEPROM 12 that enables a user to rewrite a stored content. Setting data is written on the EEPROM 12 from a data terminal DATA by the user. Depending on the setting data, the settings of compensation operations by using the various compensation circuits in the compensation block 8 are adjusted, and settings of temperature detection by using the temperature sensor circuit 11 are adjusted.

According to the present preferred embodiment, the linearity adjustment is provided by the linearity compensation circuit 5 in a manner in which the amplification factor (R5/R4) of the compensation amplifier circuit 4 is made variable as described later. The amplification factor (R5/R4) is made variable in a manner in which connection states between the multiple resistors that are included in the variable resistor R4 are switched by the multiple switches depending on the setting data that is written on the EEPROM 12. The temperature coefficient sensitivity compensation is provided by the temperature coefficient sensitivity rough-adjustment compensation circuit 6a and the temperature coefficient sensitivity fine-adjustment compensation circuit 6b in a manner in which the resistance values of variable resistors R11 to R14 described later and reference voltages VREF3 and VREF4 (see FIG. 5) are switched depending on the setting data that is written on the EEPROM 12. The temperature-characteristic-of-offset compensation is provided by the temperature-characteristic-of-offset compensation circuit 7 in a manner in which connection states between switches 75 and 76 (see FIG. 8) described later are switched depending on the setting data that is written on the EEPROM 12. The temperature sensor circuit 11 is adjusted depending on the setting data that is written on the EEPROM 12 such that a voltage of 1 [V] is outputted as the voltage conversion temperature when the ambient temperature is about 25° C., for example.

Figure 2:
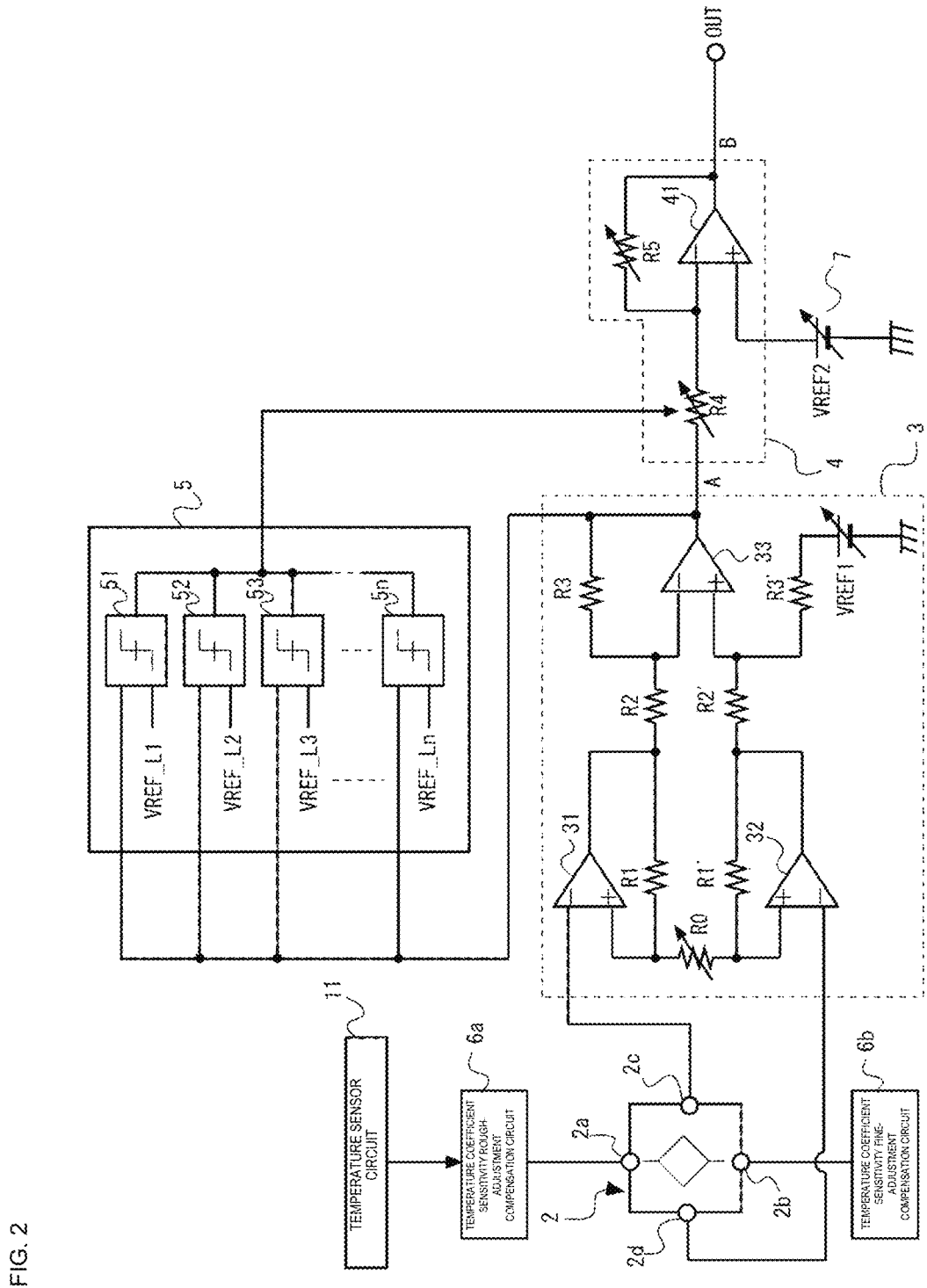
FIG. 2 is a circuit diagram for describing the function of a linearity compensation circuit in the sensor output compensation circuit illustrated in FIG. 1.

FIG. 2 is a circuit diagram for describing the function of the linearity compensation circuit 5 in the sensor output compensation IC 1 illustrated in FIG. 1. In FIG. 2, the same or corresponding components to those in FIG. 1 are designated by the same reference signs, and the description thereof is omitted.

The linearity compensation circuit 5 includes multiple comparators 51, 52, 53, . . . , and 5n. The output voltage of the differential amplifier circuit 3 is applied to first input terminals of the comparators 51, 52, 53, . . . , and 5n, and predetermined reference voltages VREF_L1, VREF_L2, VREF_L3, . . . and VREF_Ln that are outputted from the reference voltage circuit 10 are applied to second input terminals. The reference voltages VREF_L1, VREF_L2, VREF_L3, . . . , and VREF_Ln correspond to sensor outputs depending on the magnetic field that causes predetermined distortion that is created in the sensor output and that has nonlinearity and are set in advance by using the setting data that is written on the EEPROM 12.

The linearity compensation circuit 5 makes the amplification factor (R5/R4) of the compensation amplifier circuit 4 variable into an amplification factor to cancel the distortion in a manner in which the multiple switches that are included in the variable resistor R4 are switched, and the resistance value of the variable resistor R4 is made variable, depending on the result of comparison between the multiple reference voltages and the output voltage of the differential amplifier circuit 3.

In the description herein, the amplification factor (R5/R4) of the compensation amplifier circuit 4 is made variable in a manner in which the multiple switches that are included in the variable resistor R4 are switched, and the resistance value of the variable resistor R4 is made variable. However, the amplification factor (R5/R4) of the compensation amplifier circuit 4 may be made variable in a manner in which the multiple switches that are included in the variable resistor R5 are switched, and the resistance value of the variable resistor R5 is made variable.

Figure 3A:
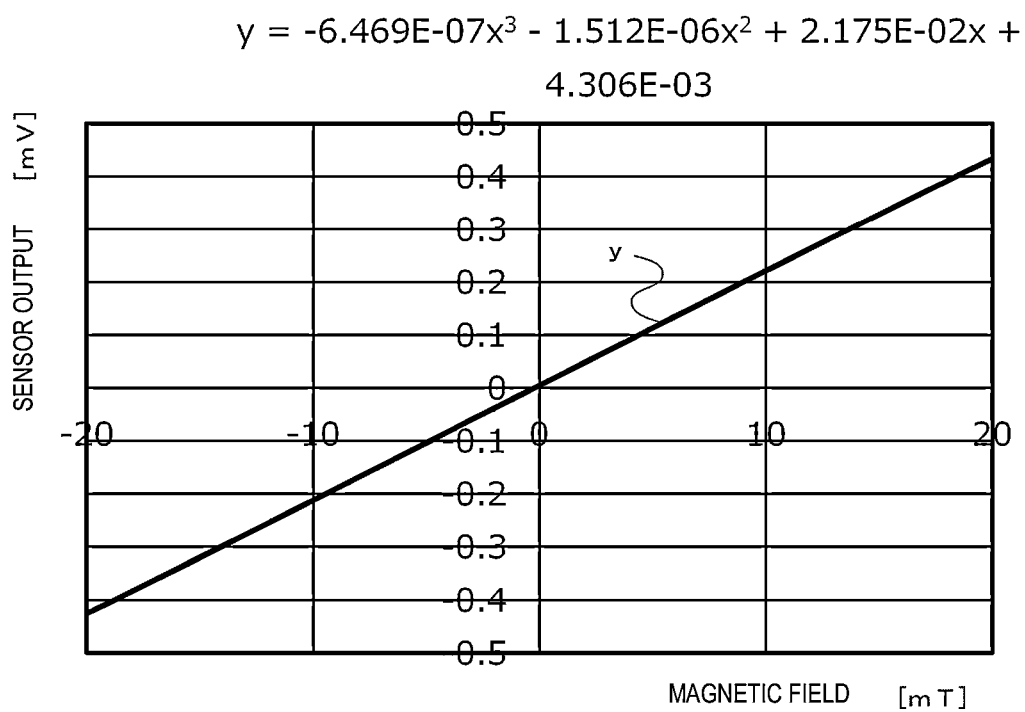
FIG. 3A is a graph illustrating a change in the sensor output with respect to a magnetic field.

FIG. 3A is a graph illustrating an example of a relationship between the magnetic field that is applied to the TMR sensor 2 and the sensor output that is measured as the differential voltage between the detection signal output terminals 2c and 2d when the magnetic field is applied to the TMR sensor 2. The horizontal axis of the graph represents the magnetic field [mT] that is applied to the TMR sensor 2, and the vertical axis represents the sensor output [mV]. A characteristic line y represents a change in the sensor output with respect to the magnetic field when the ambient temperature of the sensor output compensation IC 1 is about 25° C., for example, and represents the linearity characteristics of the sensor output. The characteristic line y is expressed as the following polynomial expression (3):

$$y = -6.469e^{-0.7}x^3 - 1.512e^{-0.6}x^2 + 2.175e^{-0.2}x + 4.306e^{-0.3}, \quad (3)$$

where a magnetic field x is a variable.

Figure 3B:
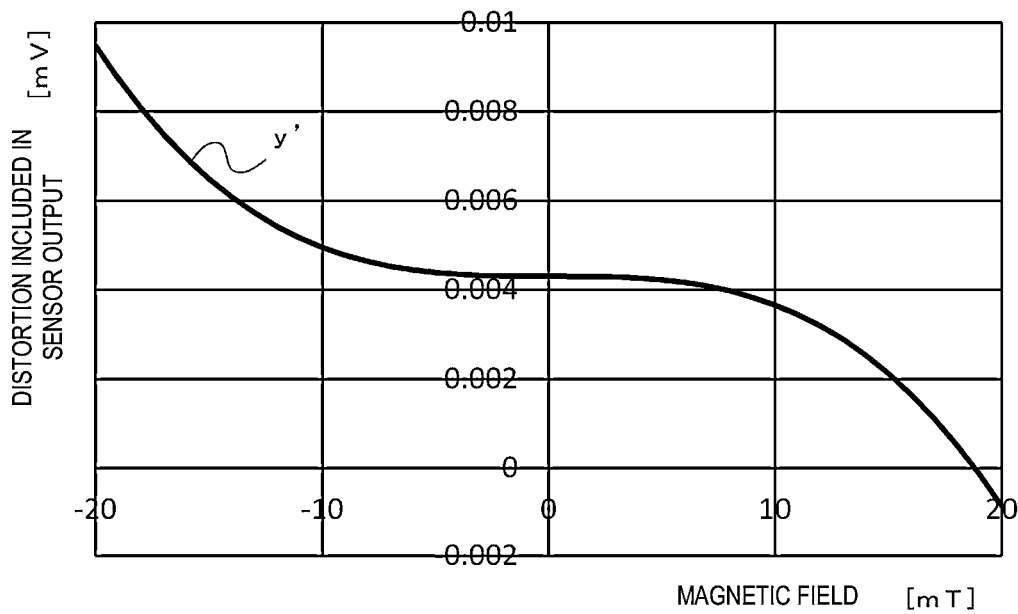
FIG. 3B is a graph illustrating the distortion of the sensor output that has nonlinearity.

In the graph, the characteristic line y appears to be linear but includes nonlinear components expressed by a first term and a second term in a right-hand side of the expression (3). A graph illustrated in FIG. 3B represents a relationship between the magnetic field and the sensor output except for a linear component in a third term in the right-hand side. The horizontal axis of the graph represents the magnetic field

[mT] that is applied to the TMR sensor 2, and the vertical axis represents the sensor output [mV] except for the linear component. A characteristic line y' represents the distortion of the sensor output that has nonlinearity. The distortion affects the precision of detection of the magnetic field by using the TMR sensor 2, and accordingly, the linearity compensation circuit 5 adjusts the distortion.

In the graph, the distortion is seen in a magnetic field region of about +8 [mT] or more and a magnetic field region of about −8 [mT] or less. Accordingly, when the sensor output is obtained with respect to a predetermined magnetic field in each magnetic field region, the linearity compensation circuit 5 cancels the distortion by making the amplification factor of the compensation amplifier circuit 4 variable.

Figure 4A:
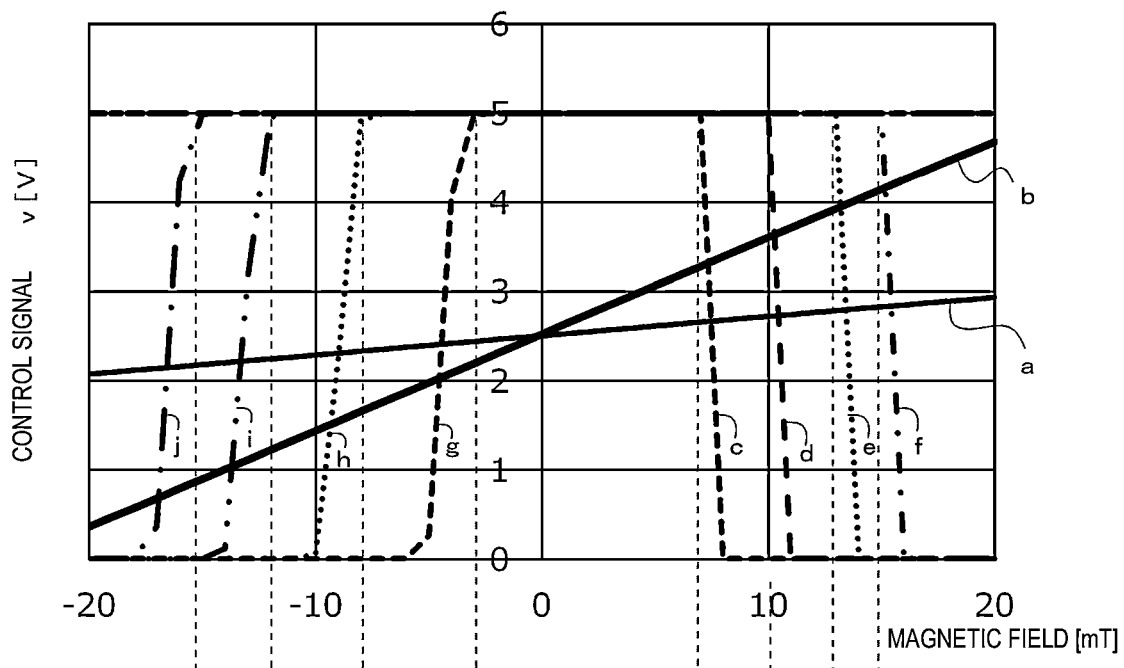
FIG. 4A is a graph illustrating a control signal that is outputted from the linearity compensation circuit to change the resistance value of a variable resistor R4.

FIG. 4A is a graph illustrating an example of a control signal v that is outputted from the linearity compensation circuit 5 to the switches of the variable resistor R4. The horizontal axis of the graph represents the magnetic field [mT] that is applied to the TMR sensor 2, and the vertical axis represents the voltage [V] of the control signal v. A characteristic line a represents a change in input voltages that are applied to the input terminals 1a and 1b of the sensor output compensation IC 1 due to the magnetic field. A characteristic line b represents a change in the output voltage VOUT that is outputted to the output terminal out of the sensor output compensation IC 1 due to the magnetic field. Characteristic lines c, d, e, and f represent control signals v1, v2, v3, and v4 to correct the distortion of a sensor output of about +8 [mT] or more in a positive magnetic field illustrated in FIG. 3B. Characteristic lines g, h, i, and j represent control signals v5, v6, v7, and v8 to correct the distortion of a sensor output of about −8 [mT] or less in a negative magnetic field. The control signals v1 to v8 change between a high level of about +5 [V] and a low level of about 0 [V]. For example, a change into the low level results in close control of switches sw1 to sw8.

In the graph, as for the distortion of the sensor output in a magnetic field region of about +8 [mT] or more, when the magnetic field is about +7 [mT], the level of the control signal v1 that is represented by the characteristic line c is reduced, and the close control of the switch sw1 is consequently provided. Consequently, the resistance value of the variable resistor R4 is made variable, and the amplification factor of the compensation amplifier circuit 4 is changed into an amplification factor to cancel the distortion in the magnetic field. When the magnetic field is about +10 [mT], the level of the control signal v2 that is represented by the characteristic line d is reduced, and the close control of the switch sw2 is consequently provided, or when the magnetic field is about +13 [mT], the level of the control signal v3 that is represented by the characteristic line e is reduced, and the close control of the switch sw3 is consequently provided, or when the magnetic field is about +15 [mT], the level of the control signal v4 that is represented by the characteristic line f is reduced, and the close control of the switch sw4 is consequently provided. Consequently, the resistance value of the variable resistor R4 is made variable, and the amplification factor of the compensation amplifier circuit 4 is changed into the amplification factor to cancel the distortion in the magnetic field.

Similarly, as for the distortion of the sensor output in a magnetic field region of about −8 [mT] or less, the close control of the switches sw5 to sw8 is provided by using the control signals v5 to v8 that are represented by the characteristic lines g to j, and consequently, the resistance value of the variable resistor R4 is made variable, and the amplification factor of the compensation amplifier circuit 4 is changed into the amplification factor to cancel the distortion in the magnetic field.

Figure 4B:
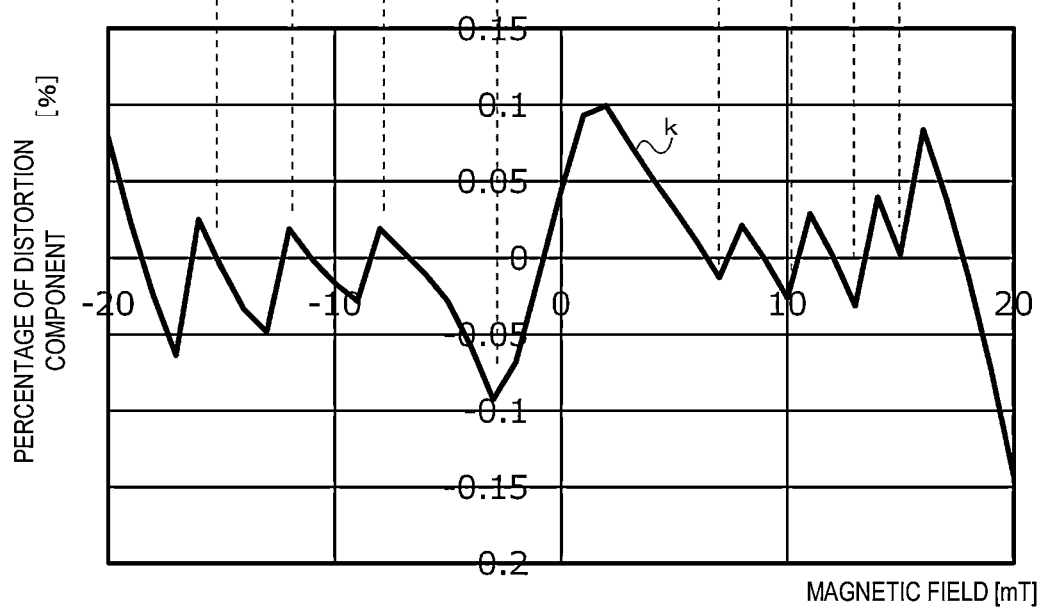
FIG. 4B is a graph illustrating the distortion of the sensor output that is compensated by the linearity compensation circuit.

FIG. 4B is a graph illustrating the distortion of the sensor output after the nonlinearity of the sensor output is compensated for by controlling the resistance value of the variable resistor R4 by using the linearity compensation circuit 5. The horizontal axis of the graph represents the magnetic field [mT] that is applied to the TMR sensor 2, and the vertical axis represents the percentage [%] of a distortion component that is included in the output voltage VOUT that is outputted to the output terminal out of the sensor output compensation IC 1. A characteristic line k represents variation characteristics of the distortion component that is included in the output voltage VOUT with respect to a change in the magnetic field.

The distortion of the sensor output in a magnetic field region of about +8 [mT] or more decreases in the right-hand direction as the magnetic field increases as illustrated in FIG. 3B. However, it is understood from the characteristic line k that when the levels of the control signals v1, v2, v3, and v4 are sequentially reduced when the magnetic field is about +7 [mT], about +10 [mT], about +13 [mT], or about +15 [mT], the amplification factor of the compensation amplifier circuit 4 is increased, the percentage of the distortion component consequently increases in the right-hand direction, and a decrease in the distortion illustrated in FIG. 3B is canceled.

The distortion of the sensor output in a magnetic field region of about −8 [mT] or less increases in the left-hand direction as the magnetic field decreases as illustrated in FIG. 3B. However, it is similarly understood from the characteristic line k that when the levels of the control signals v5 to v8 are sequentially reduced as the magnetic field decreases, the amplification factor of the compensation amplifier circuit 4 is decreased, the percentage of the distortion component consequently decreases in the left-hand direction, and an increase in the distortion illustrated in FIG. 3B is canceled.

The percentage of the distortion component increases in the right-hand direction in a positive magnetic field region and temporarily decreases in the right-hand direction due to a decrease in the original distortion illustrated in FIG. 3B, and decreases in the left-hand direction in a negative magnetic field region and temporarily increases in the left-hand direction due to an increase in the original distortion illustrated in FIG. 3B. Accordingly, as illustrated in FIG. 4B, the characteristic line k varies upward and downward into a zigzag manner, but the range of the variation in the distortion component is reduced to about ±0.1 [%] or less, and the linearity of the sensor output is guaranteed.

As for the sensor output compensation IC 1 according to the present preferred embodiment as described above, the amplification factor of the compensation amplifier circuit 4 is made variable in a manner in which connections between the multiple resistors that are connected to the compensation amplifier circuit 4 as the variable resistor R4 are switched under control of the multiple switches of the linearity compensation circuit 5, and the combined resistance value of the multiple resistors is changed. The switching operation of the switches is performed when the output voltage of the differential amplifier circuit 3 is compared with the predetermined multiple reference voltages VREF_L1, VREF_L2, VREF_L3, . . . , and VREF_Ln and becomes a voltage corresponding to the sensor output depending on the magnetic field that causes the predetermined distortion. The switching operation of the switches adjusts the amplification factor of the compensation amplifier circuit 4 to the amplification factor to cancel the predetermined distortion in the output of the differential amplifier circuit 3 depending on the output voltage of the differential amplifier circuit 3, and the linearity of the sensor output is guaranteed.

That is, as for the sensor output compensation IC 1 according to the present preferred embodiment, the distortion that has nonlinearity in the sensor output as the magnetic field changes is compensated for in a manner in which the amplification factor of the compensation amplifier circuit 4 that adjusts the output of the differential amplifier circuit 3 is made variable into the amplification factor to cancel the distortion by using the linearity compensation circuit 5. Accordingly, a circuit reaction speed increases, and the nonlinearity compensation of the sensor output is provided at a high speed unlike an existing nonlinearity compensation circuit (see Japanese Unexamined Patent Application Publication No. 2003-248017) that feeds back the sensor output and provides linearity compensation. The sensor output compensation circuit needs no adder circuits unlike existing cases, and accordingly, the circuit scale of the sensor output compensation IC 1 can be reduced.

Figure 5:
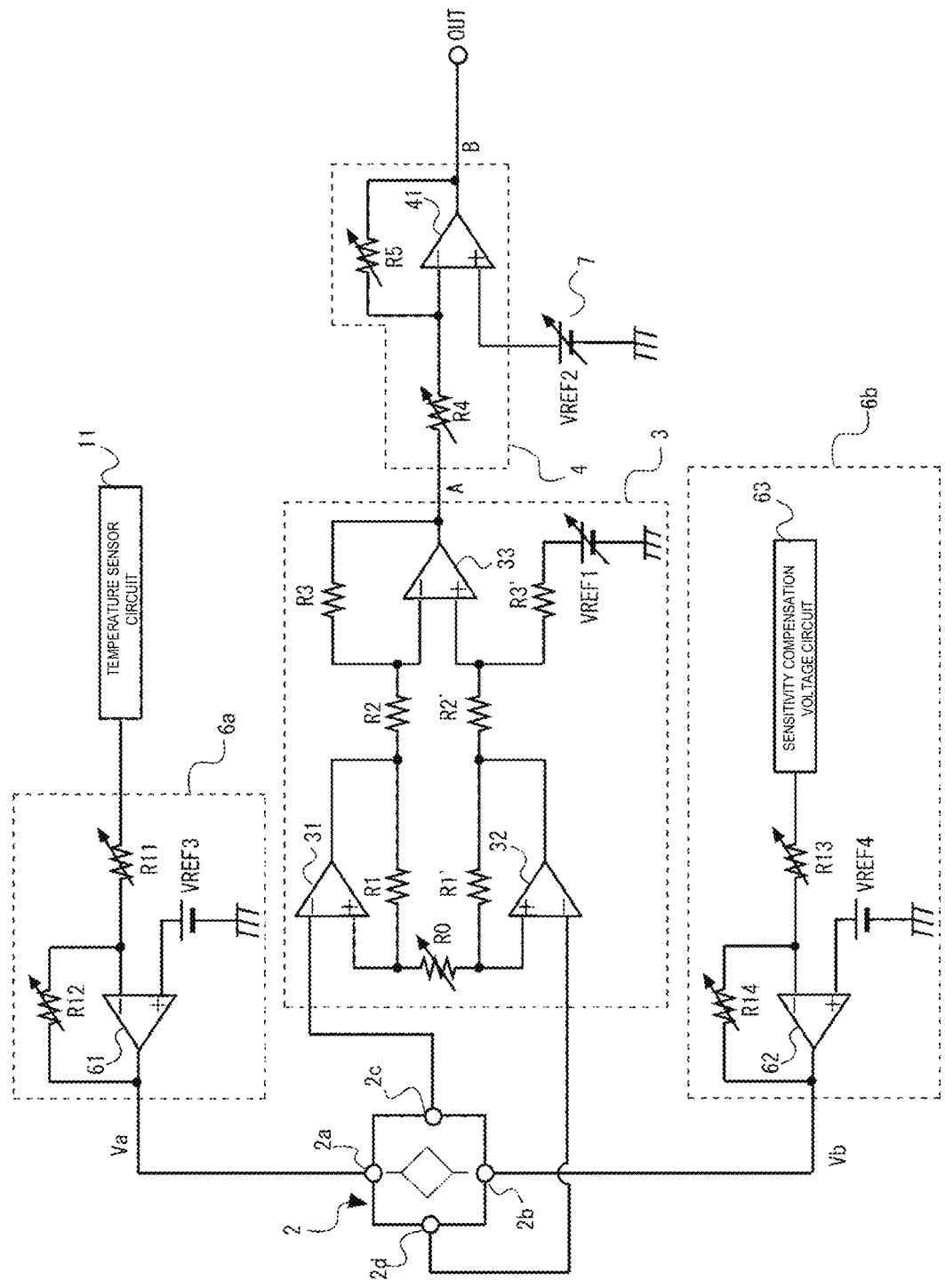
FIG. 5 is a circuit diagram for describing the function of a temperature coefficient sensitivity compensation circuit in the sensor output compensation circuit illustrated in FIG. 1.

FIG. 5 is a circuit diagram for describing the functions of the temperature coefficient sensitivity rough-adjustment compensation circuit 6a and the temperature coefficient sensitivity fine-adjustment compensation circuit 6b in the sensor output compensation IC 1 illustrated in FIG. 1. In FIG. 5, the same or corresponding components as those in FIG. 1 are designated by the same reference signs, and the description thereof is omitted. The temperature coefficient sensitivity rough-adjustment compensation circuit 6a and the temperature coefficient sensitivity fine-adjustment compensation circuit 6b are included in the temperature coefficient sensitivity compensation circuit that applies a bias voltage to cancel a variation in the sensitivity of the sensor output as the ambient temperature changes to the two power terminals 2a and 2b of the TMR sensor 2, based on the ambient temperature that is detected by the temperature sensor circuit 11. The TMR sensor 2 can make sensor sensitivity variable by adjusting the bias voltage and can accordingly adjust the temperature characteristics of the sensitivity by making the bias voltage variable with respect to the ambient temperature.

The temperature coefficient sensitivity rough-adjustment compensation circuit 6a includes an inverting amplifier circuit that includes an operational amplifier 61, a rough-adjustment variable resistor R11, and a rough-adjustment variable resistor R12. The reference voltage VREF3 that is generated by the reference voltage circuit 10 is applied to a non-inverting input terminal of the operational amplifier 61. The temperature coefficient sensitivity rough-adjustment compensation circuit 6a receives the voltage conversion temperature that is outputted depending on the ambient temperature from the temperature sensor circuit 11. The inverting amplification of the voltage conversion temperature is performed with an amplification factor (R12/R11) that corresponds to a change ratio of the sensitivity of the sensor output to the ambient temperature, a bias voltage Va is generated and is applied to the power terminal 2a of the two power terminals 2a and 2b.

Figure 6A:
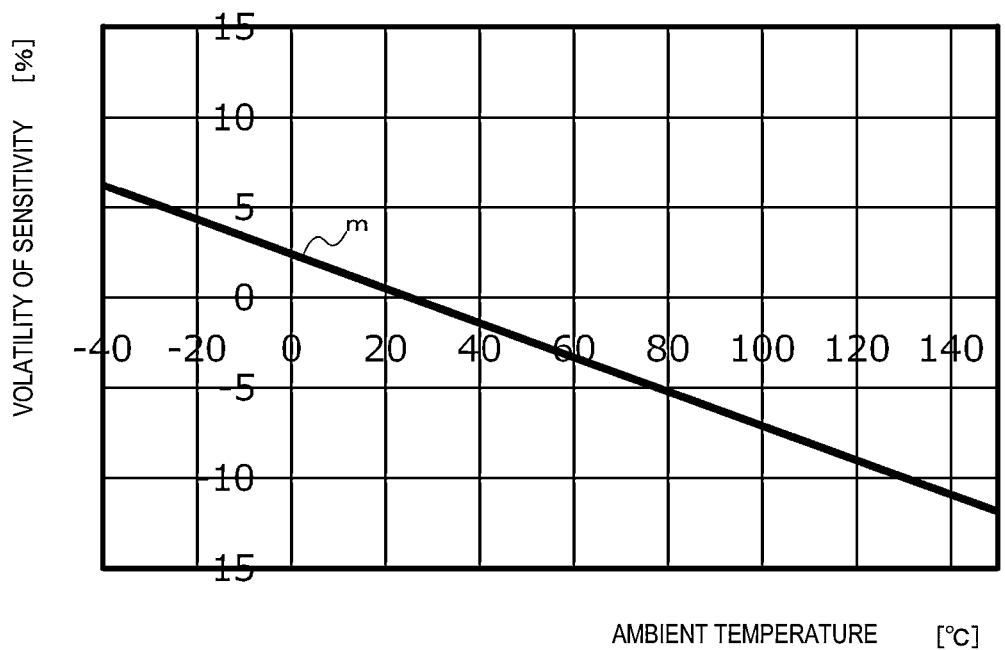
FIG. 6A is a graph illustrating temperature characteristics concerning the sensitivity of the sensor output.

FIG. 6A is a graph illustrating an example of the temperature characteristics concerning the sensitivity of the sensor output. The horizontal axis of the graph represents the ambient temperature [° C.] of the TMR sensor 2, and the vertical axis represents the volatility [%] of the sensitivity at the ambient temperature when a magnetic field of about 20 [mT] is applied to the TMR sensor 2. A characteristic line m represents characteristics of the volatility of the sensitivity as the ambient temperature changes and is expressed as the following expression (4):

$$m = -0.0952x + 2.4[\%], \quad (4)$$

where the ambient temperature is a variable x.

As illustrated by the characteristic line m in the graph, the volatility of the sensitivity has temperature characteristics that have a linear slope (−0.0952x) and that linearly decrease as the temperature increases. Accordingly, according to the present preferred embodiment, the bias voltage Va that has the linear slope (+0.0952x) opposite that of the characteristic line m is applied as a temperature compensation voltage to the two power terminals 2a and 2b of the TMR sensor 2, and the sensitivity is adjusted such that the characteristic line m is characterized so as to be flat with respect to the change in the ambient temperature, in order to prevent the sensitivity from being affected by the influence of a change in the ambient temperature.

For this purpose, according to the present preferred embodiment, the voltage conversion temperature that is outputted from the temperature sensor circuit 11 and that has a slope the polarity of which is the same or substantially the same as that of the characteristic line m is inputted into the temperature coefficient sensitivity rough-adjustment compensation circuit 6a, and the inverting amplifier circuit of the temperature coefficient sensitivity rough-adjustment compensation circuit 6a inverts the polarity of the slope of the voltage conversion temperature. The voltage conversion temperature is amplified with the amplification factor (R12/R11) of the inverting amplifier circuit such that the magnitude of the slope of the voltage conversion temperature is equal or substantially equal to the magnitude of the slope of the characteristic line m, that is, the amplification factor that corresponds to the change ratio of the sensitivity of the sensor output to the ambient temperature, and the temperature compensation voltage that corresponds to the bias voltage Va is generated.

Figure 7:
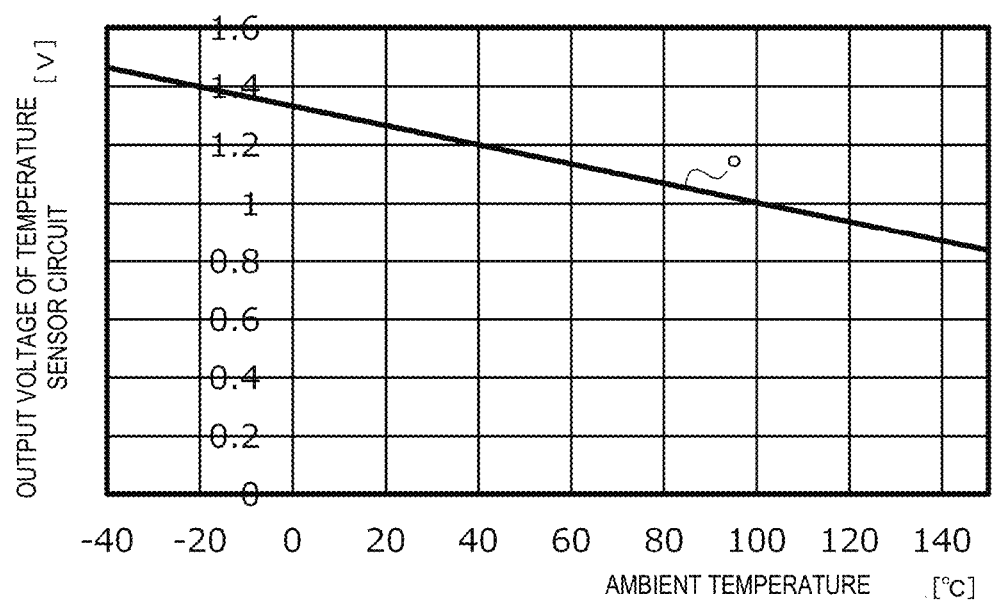
FIG. 7 is a graph illustrating a change in voltage conversion temperature that is outputted from a temperature sensor circuit with respect to ambient temperature.

FIG. 7 is a graph illustrating a change in the voltage conversion temperature that is outputted from the temperature sensor circuit 11 with respect to the ambient temperature. The horizontal axis of the graph represents the ambient temperature [° C.] of the sensor output compensation IC 1, and the vertical axis represents the output voltage [V] of the temperature sensor circuit 11 at the ambient temperature. A characteristic line o represents the temperature characteristics of the voltage conversion temperature that is the output voltage of the temperature sensor circuit 11. As illustrated in the graph, the characteristic line o of the voltage conversion temperature and the characteristic line m of the volatility of the sensitivity have a slope that linearly decreases as the temperature increases and that has a negative polarity.

The inverting amplifier circuit of the temperature coefficient sensitivity rough-adjustment compensation circuit 6a changes the amplification factor (R12/R11) when the resistance value of the rough-adjustment variable resistor R11 or the rough-adjustment variable resistor R12 to be connected is changed. The resistance values of the rough-adjustment variable resistor R11 and the rough-adjustment variable resistor R12 are made variable in a manner in which connections between multiple rough-adjustment resistors are switched by multiple switches, and the combined resistance value of the multiple rough-adjustment resistors is changed. The switching operation of the switches adjusts the amplification factor (R12/R11) of the inverting amplifier circuit to the amplification factor to cancel the variation in the sensitivity that is caused by the ambient temperature, and the magnitude of the slope of the characteristic line o of the voltage conversion temperature is adjusted to the magnitude of the slope of the characteristic line m of the volatility of the sensitivity. The inverting amplifier circuit performs the inverting amplification of the voltage conversion temperature, and consequently, the polarity of the slope of the characteristic line o of the voltage conversion temperature is opposite the polarity of the slope of the characteristic line m of the volatility of the sensitivity.

Accordingly, the bias voltage Va that is obtained by the inverting amplification of the voltage conversion temperature that is outputted from the temperature sensor circuit 11 with the amplification factor (R12/R11) that corresponds to the change ratio of the sensitivity to the ambient temperature is applied as a sensitivity temperature compensation voltage to the power terminal 2a of the two power terminals 2a and 2b of the TMR sensor 2. Accordingly, variation components of the sensitivity that is included in the sensor output that are measured in the two detection signal output terminals 2c and 2d of the TMR sensor 2 are canceled in a manner in which the bias voltage Va that changes with the opposite polarity and the same or substantially the same change ratio as the change ratio of the sensitivity to the ambient temperature is applied to the power terminal 2a of the sensor. In addition, a dedicated circuit to compensate for the temperature coefficient sensitivity is not provided, and the variation components of the sensitivity are canceled by using the temperature sensor circuit 11.

Figure 6B:
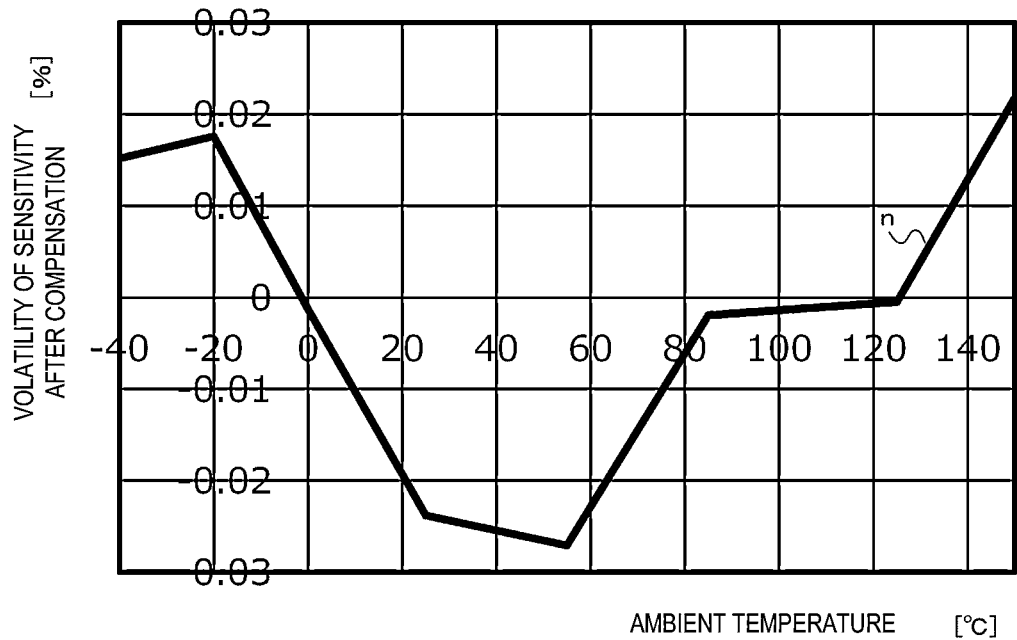
FIG. 6B is a graph illustrating the temperature characteristics concerning the sensitivity of the sensor output after the temperature coefficient sensitivity compensation circuit provides sensitivity temperature compensation.

FIG. 6B is a graph illustrating the ambient temperature characteristics of the volatility of the sensitivity after the temperature compensation in the above manner. The horizontal axis of the graph illustrated in FIG. 6B represents the ambient temperature [° C.], and the vertical axis represents the volatility [%] of the sensitivity at the ambient temperature when a magnetic field of about 20 [mT] is applied to the TMR sensor 2 as in the graph in FIG. 6A. A characteristic line n represents the volatility of the sensitivity with respect to the ambient temperature. As illustrated in the graph, the volatility of the sensitivity of the sensor output compensation IC 1 after compensation is within a small range of about ±0.03 [%] or less.

According to the present preferred embodiment, however, the temperature compensation of the sensitivity is provided with higher precision, and accordingly, the temperature coefficient sensitivity fine-adjustment compensation circuit 6b that is included in the temperature coefficient sensitivity compensation circuit generates a minute-compensation bias voltage to further cancel a minor variation in the sensitivity of the sensor output that remains as illustrated in FIG. 6B after canceling due to the action of the temperature coefficient sensitivity rough-adjustment compensation circuit 6a. The generated minute-compensation bias voltage is applied as a bias voltage Vb to the power terminal 2b of the two power terminals 2a, 2b.

The temperature coefficient sensitivity fine-adjustment compensation circuit 6b includes an inverting amplifier circuit that includes an operational amplifier 62, a fine-adjustment variable resistor R13, and a fine-adjustment variable resistor R14, and a sensitivity compensation voltage circuit 63. A reference voltage VREF4 that is generated by the reference voltage circuit 10 is applied to a non-inverting input terminal of the operational amplifier 62. The sensitivity compensation voltage circuit 63 generates a sensitivity compensation voltage on which the minute-compensation bias voltage to cancel the minor variation in the sensitivity of the sensor output that remains is based. The inverting amplifier circuit that includes the operational amplifier 62 performs the inverting amplification of the sensitivity compensation voltage that is generated by the sensitivity compensation voltage circuit 63 with an amplification factor (R14/R13), generates the minute-compensation bias voltage, and outputs the minute-compensation bias voltage to the power terminal 2b.

The amplification factor (R14/R13) changes when the resistance value of the fine-adjustment variable resistor R13 or the fine-adjustment variable resistor R14 that is connected to the operational amplifier 62 is changed. The resistance values of the fine-adjustment variable resistor R13 and the fine-adjustment variable resistor R14 are made variable in a manner in which connections between multiple fine-adjustment resistors are switched by multiple switches, and the combined resistance value of the multiple fine-adjustment resistors is changed. The switching operation of the switches adjusts the magnitude of the minute-compensation bias voltage that is generated by the temperature coefficient sensitivity fine-adjustment compensation circuit 6b, and the minor variation in the sensitivity of the sensor output that remains after canceling due to the action of the temperature coefficient sensitivity rough-adjustment compensation circuit 6a is appropriately canceled.

As for the sensor output compensation IC 1 according to the present preferred embodiment as described above, the variation in the sensitivity of the sensor output as the ambient temperature changes is canceled and adjusted in a manner in which the bias voltage Va to cancel the variation is applied to the two power terminals 2a and 2b of the sensor by using the temperature coefficient sensitivity compensation circuit as described above. Accordingly, unlike the existing temperature compensation circuit that is disclosed in Japanese Unexamined Patent Application Publication No. 11-194160 and that provides only temperature compensation depending on thermistor characteristics, a temperature range in which the temperature compensation can be provided is not limited. In addition, the temperature compensation characteristics do not vary due to a thermistor element unlike existing cases. For this reason, the sensitivity temperature compensation can be uniformly provided with precision in all temperature regions. The sensor output compensation circuit can be provided without using a thermistor element for a temperature compensation circuit. Accordingly, the sensor output compensation circuit can be provided as an IC, and the size and cost of the sensor output compensation circuit can be reduced.

As for the sensor output compensation IC 1 according to the present preferred embodiment, the minor variation in the sensitivity of the sensor output that remains after canceling due to the action of the temperature coefficient sensitivity rough-adjustment compensation circuit 6a is canceled in a manner in which the bias voltage Vb to further cancel the minor variation is generated as the minute-compensation bias voltage by using the temperature coefficient sensitivity fine-adjustment compensation circuit 6b and is applied to the power terminal 2b of the two power terminals 2a and 2b. For this reason, the sensitivity temperature compensation can be uniformly provided with higher precision in all temperature regions.

The bias voltage of the TMR sensor 2 is adjusted at two positions of the power terminals 2a and 2b, and consequently, the temperature coefficient sensitivity compensation circuit can have a rough-adjustment function and a fine-adjustment function. This enables the temperature coefficient sensitivity rough-adjustment compensation circuit 6a and the temperature coefficient sensitivity fine-adjustment compensation circuit 6b to be optimally designed. For this reason, the circuit constants of elements that are included in the circuits can be optimized, the adjustment resolution of the circuits can be improved, and the areas of the circuits can be reduced or prevented from increasing. The sensor output compensation IC 1 according to the present preferred embodiment directly controls the bias voltage of the TMR sensor 2 and can adjust the sensor sensitivity, and detection precision is ensured.

Figure 8:
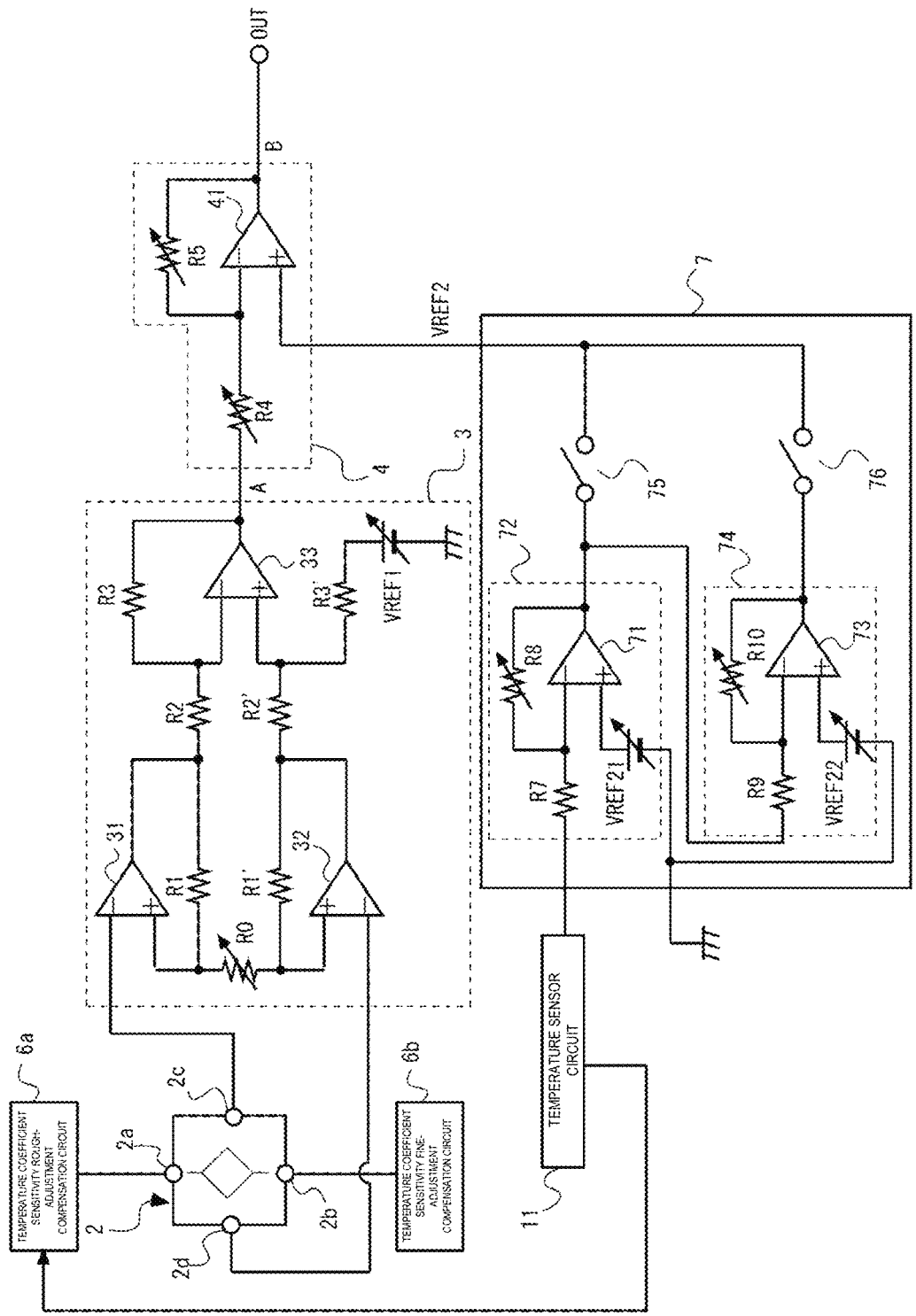
FIG. 8 is a circuit diagram for describing the function of a temperature-characteristic-of-offset compensation circuit in the sensor output compensation circuit illustrated in FIG. 1.

FIG. 8 is a circuit diagram for describing the function of the temperature-characteristic-of-offset compensation circuit 7 in the sensor output compensation IC 1 illustrated in FIG. 1. In FIG. 8, the same or corresponding components as those in FIG. 1 are designated by the same reference signs, and the description thereof is omitted.

The temperature-characteristic-of-offset compensation circuit 7 refers the ambient temperature that is detected by the temperature sensor circuit 11 and applies a reference voltage VREF2 to cancel the variation in the offset voltage of the sensor output as the ambient temperature changes to a reference voltage terminal of the compensation amplifier circuit 4.

Figure 9A:
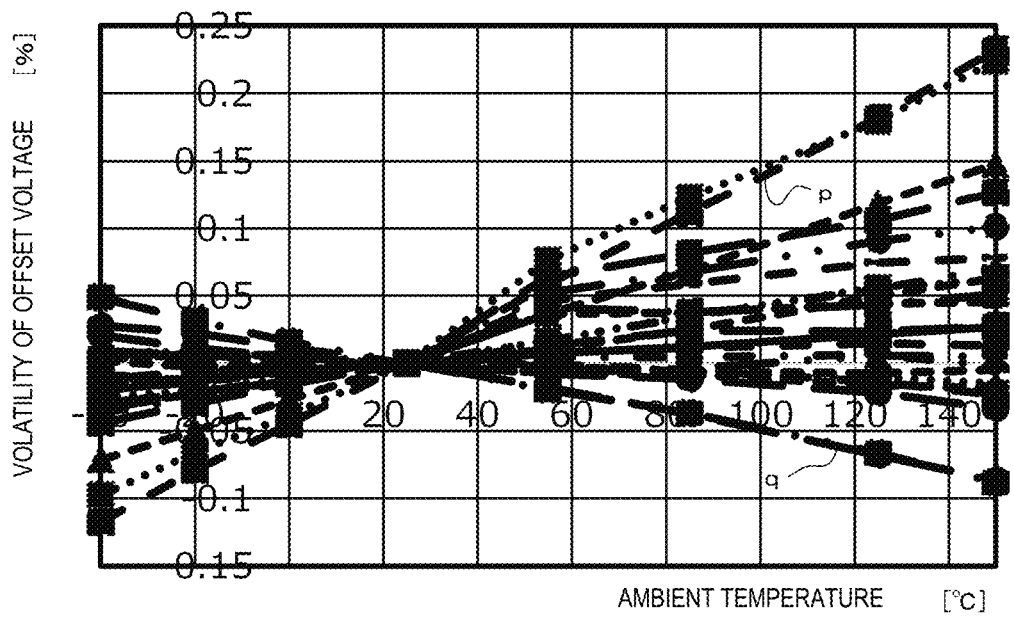
FIG. 9A is a graph illustrating the temperature characteristics of the volatility of an offset voltage.

The temperature variation in the offset voltage of the sensor output is illustrated in a graph illustrated in FIG. 9A. The horizontal axis of the graph represents the ambient temperature [° C.] of the sensor output compensation IC 1, and the vertical axis represents the volatility [%] of the offset voltage at the ambient temperature, based on the offset voltage when the ambient temperature is about 25° C., for example. Characteristic lines represent the temperature characteristics of offset voltages concerning multiple TMR sensors 2. As illustrated in the graph, the temperature characteristics of the offset voltages linearly vary with linear slopes. The temperature-characteristic-of-offset compensation circuit 7 applies the reference voltage VREF2 to cancel the variation to the reference voltage terminal that is a non-inverting input terminal of the operational amplifier 41 in the compensation amplifier circuit 4.

According to the present preferred embodiment, the temperature-characteristic-of-offset compensation circuit 7 includes a first inverting amplifier circuit 72 that includes an operational amplifier 71, a second inverting amplifier circuit 74 that includes an operational amplifier 73, the first switch 75, and the second switch 76.

As for the first inverting amplifier circuit 72, a resistor R7 and a variable resistor R8 are connected to the operational amplifier 71, and a reference voltage VREF21 is applied to a non-inverting input terminal of the operational amplifier 71. The first inverting amplifier circuit 72 performs the inverting amplification of the ambient temperature that is detected by the temperature sensor circuit 11 as a voltage with an amplification factor (R8/R7) that corresponds to the volatility of the offset voltage. The volatility of the offset voltage corresponds to the slope of each characteristic line in the graph illustrated in FIG. 9A. The resistance value of the variable resistor R8 is adjusted, and consequently, the amplification factor (R8/R7) is matched with the volatility of the offset voltage.

As for the second inverting amplifier circuit 74, a resistor R9 and a variable resistor R10 are connected to the operational amplifier 73, and a reference voltage VREF22 is applied to a non-inverting input terminal of the operational amplifier 73. The second inverting amplifier circuit 74 performs the inverting amplification of the output of the first inverting amplifier circuit 72 with an amplification factor (R10/R9) and inverts the polarity thereof. The resistance value of the variable resistor R10 is adjusted, and consequently, the amplification factor (R10/R9) is basically set to 1. When the variation in the offset voltage with respect to the ambient temperature increases as the ambient temperature increases, the close control of the second switch 76 is provided, and the output of the second inverting amplifier circuit 74 is inputted as the reference voltage VREF2 into the reference voltage terminal of the operational amplifier 41.

Accordingly, for example, in a case where the temperature characteristics of the offset voltage of the sensor output compensation IC 1 are represented by using a characteristic line p that linearly increases in the right-hand direction such that the variation with respect to the ambient temperature increases as the ambient temperature increases in the graph illustrated in FIG. 9A, a voltage that is outputted from the temperature sensor circuit 11 such that the voltage decreases as the ambient temperature increases and that is represented by a characteristic line that linearly decreases in the right-hand direction is first converted into a voltage that has a slope the magnitude of which is equal or substantially equal to the magnitude of the volatility of the offset voltage of the characteristic line p and that has characteristics increasing in the right-hand direction such that the polarity of the slope is inverted by using the first inverting amplifier circuit 72 in the temperature-characteristic-of-offset compensation circuit 7. The close operation of the second switch 76 is provided, and accordingly, the voltage is converted into the reference voltage VREF2 that has characteristics decreasing in the right-hand direction such that the polarity of the slope is inverted by using the second inverting amplifier circuit 74. For this reason, the compensation amplifier circuit 4 amplifies the output voltage including the offset voltage that is outputted from the differential amplifier circuit 3 and that is represented by using the characteristic line p that linearly rises in the right-hand direction, based on the reference voltage VREF2, and consequently, the variation in the offset voltage due to the temperature characteristics is canceled.

Figure 9B:
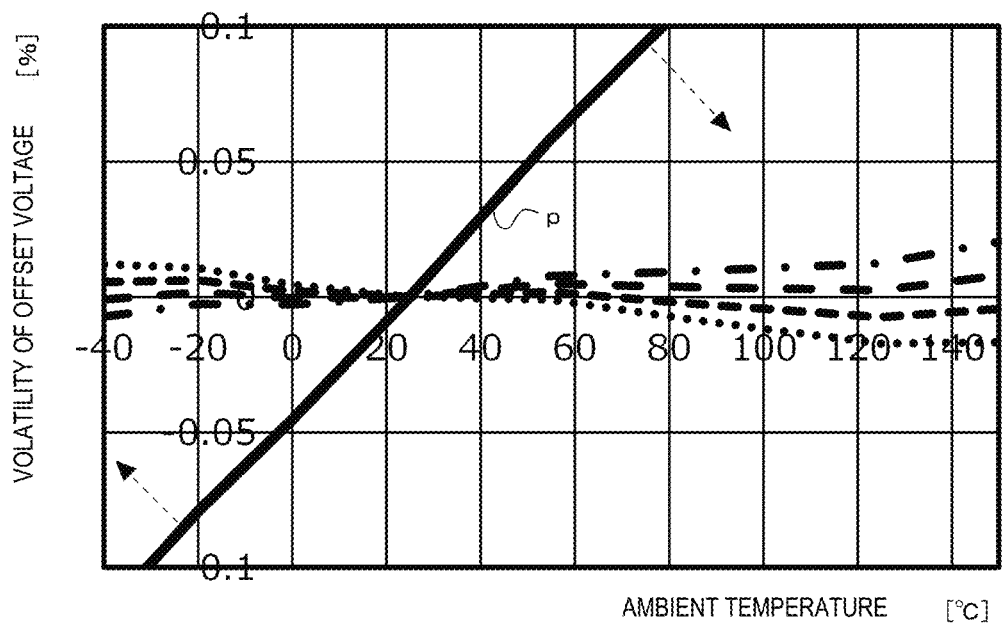
FIG. 9B is a graph illustrating the temperature characteristics of the volatility of the offset voltage that is compensated by the temperature-characteristic-of-offset compensation circuit.

FIG. 9B is a graph illustrating the temperature characteristics of offset voltages that are adjusted by the temperature-characteristic-of-offset compensation circuit 7 concerning four TMR sensors 2. The horizontal axis and the vertical axis of the graph are the same as those in FIG. 9A. In the graph illustrated in FIG. 9B, the characteristic line p before adjustment is illustrated. As illustrated by using an arrow that is represented by using a dashed line, the slope is tilted downward by the offset compensation described above, and the temperature characteristics of the offset voltage concerning the TMR sensor 2 that has the characteristic line p are adjusted into temperature characteristics that have a flat or substantially flat slope.

The close control of the first switch 75 is provided in the case where the variation in the offset voltage with respect to the ambient temperature decreases as the ambient temperature increases, and the output of the first inverting amplifier circuit 72 is inputted as the reference voltage VREF2 into the reference voltage terminal of the operational amplifier 41. Accordingly, for example, in the case where the temperature characteristics of the offset voltage of the TMR sensor 2 are represented by using a characteristic line q that linearly decreases in the right-hand direction such that the variation with respect to the ambient temperature decreases as the ambient temperature increases in the graph illustrated in FIG. 9A, a voltage that is outputted from the temperature sensor circuit 11 such that the voltage decreases as the ambient temperature increases and that is represented by a characteristic line that linearly falls in the right-hand direction is converted into the reference voltage VREF2 that has a slope the magnitude of which is equal or substantially equal to the magnitude of the volatility of the offset voltage of the characteristic line q and that has characteristics increasing in the right-hand direction such that the polarity of the slope is inverted by using the first inverting amplifier circuit 72 in the temperature-characteristic-of-offset compensation circuit 7 because the close control of the first switch 75 is provided. For this reason, the compensation amplifier circuit 4 amplifies the output voltage including the offset voltage that is outputted from the differential amplifier circuit 3 and that is represented by using the characteristic line q that linearly decreases in the right-hand direction, based on the reference voltage VREF2, and consequently, the variation in the offset voltage due to the temperature characteristics is canceled as in the graph illustrated FIG. 9B.

As for the sensor output compensation IC 1 according to the present preferred embodiment as described above, in the case where the variation in the offset voltage with respect to the ambient temperature increases as the ambient temperature increases, the output of the second inverting amplifier circuit 74 is inputted into the reference voltage terminal of the compensation amplifier circuit 4 by using the second switch 76. Accordingly, the first inverting amplifier circuit 72 performs the inverting amplification of the ambient temperature that is detected by the temperature sensor circuit 11 as a voltage with the amplification factor (R8/R7) that corresponds to the volatility of the offset voltage, the second inverting amplifier circuit 74 inverts the polarity, an ambient temperature inverting signal that decreases with the volatility of the offset voltage as the ambient temperature increases is inputted as the reference voltage VREF2 into the reference voltage terminal of the operational amplifier 41 from the second inverting amplifier circuit 74. For this reason, the compensation amplifier circuit 4 amplifies the output of the differential amplifier circuit 3, based on the ambient temperature inverting signal, and consequently, the sensor output in which the temperature variation in the offset voltage is canceled is obtained from the compensation amplifier circuit 4.

In the case where the variation in the offset voltage with respect to the ambient temperature decreases as the ambient temperature increases, the output of the first inverting amplifier circuit 72 is inputted into the reference voltage terminal of the operational amplifier 41 by using the first switch 75. Accordingly, the ambient temperature inverting signal that increases with the volatility of the offset voltage as the ambient temperature increases, which is obtained by inverting amplification performed by the first inverting amplifier circuit 72 with the amplification factor (R8/R7) that corresponds to the volatility of the offset voltage, is inputted as the reference voltage VREF2 into the reference voltage terminal of the operational amplifier 41 from the first inverting amplifier circuit 72. For this reason, the compensation amplifier circuit 4 amplifies the output of the differential amplifier circuit 3, based on the ambient temperature inverting signal, and consequently, the sensor output in which the variation in the offset voltage as the ambient temperature changes is canceled is obtained from the compensation amplifier circuit 4.

That is, as for the sensor output compensation IC 1 according to the present preferred embodiment, the variation in the offset voltage of the sensor output as the ambient temperature changes is canceled in a manner in which the compensation amplifier circuit 4 that compensates the output of the differential amplifier circuit 3 amplifies the output of the differential amplifier circuit 3, based on the reference voltage VREF2 that is applied to the reference voltage terminal of the operational amplifier 41 from the temperature-characteristic-of-offset compensation circuit 7. Accordingly, a single compensation operation enables the offset voltage to be easily adjusted with precision. For this reason, the temperature compensation of the offset voltage of the sensor output can be easily and accurately provided, unlike the existing offset adjustment circuit that is disclosed in Japanese Unexamined Patent Application Publication No. 11-194160 and that adjusts the offset of the sensor output merely by adjusting the midpoint potential of the output of the differential amplifier circuit by using the variable resistor.

As for the sensor output compensation IC 1 according to the present preferred embodiment, the circuits that are included in the sensor output compensation circuit are mounted in the same IC. Accordingly, variations caused by differences in mounting components that are included in the circuits and wiring lines between the circuits that are included in the sensor output compensation circuit are reduced. For this reason, the sensor output compensation IC 1 provides the compensation of the sensor output with precision. In addition, the IC can provide all of the compensation functions. The compensation can be provided with precision for every TMR sensor 2 with a relatively simple circuit structure in a manner in which the sensor output of the TMR sensor 2 that is adjusted is monitored. As for the adjustment of the compensation of the compensation circuits, the selection of setting data to be written on the EEPROM 12 enables a compensation value to be easily selected.

The temperature sensor circuit 11 is mounted in the same IC as the other circuits that are included in the sensor output compensation circuit, and consequently, the relative position of the temperature sensor circuit 11 with respect to the other circuits is always constant. For this reason, differences between the ambient temperature that is detected by the temperature sensor circuit 11 and the ambient temperatures of the other circuits are small. In the case where the temperature sensor circuit 11 is provided in another IC that differs from an IC in which the other circuits are provided, a parasitic resistance component of a wiring joint that connects the temperature sensor circuit 11 and the IC by using wire bonding, for example, eliminates a difference between the ambient temperature that is detected by the temperature sensor circuit 11 and an ambient temperature that is used for the IC. As a result, the sensor output compensation IC 1 according to the present preferred embodiment can provide the temperature compensation of the sensor sensitivity and the offset voltage with precision.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A sensor output compensation circuit comprising:
a differential amplifier circuit to amplify, as a sensor output, a differential voltage between detection voltages measured in two detection signal output terminals of a sensor including a sensor element that has a resistance value that changes depending on a detected physical quantity and that is connected by bridge connection;
a temperature sensor circuit to detect an ambient temperature;

a temperature coefficient sensitivity compensation circuit to apply, to two power terminals of the sensor, a bias voltage to cancel a variation in a sensitivity of the sensor output as the ambient temperature changes, based on the ambient temperature that is detected by the temperature sensor circuit; and a linearity compensation circuit connected at an output of the differential amplifier circuit to adjust linearity of the sensor output.

2. The sensor output compensation circuit according to claim 1, wherein the temperature coefficient sensitivity compensation circuit includes a temperature coefficient sensitivity rough-adjustment compensation circuit to receive a voltage conversion temperature that is outputted as a voltage from the temperature sensor circuit depending on the ambient temperature, to perform inverting amplification of the voltage conversion temperature with an amplification factor corresponding to a change ratio of the sensitivity of the sensor output to the ambient temperature, to generate the bias voltage, and to apply the bias voltage to one of the two power terminals.

3. The sensor output compensation circuit according to claim 2, wherein the temperature coefficient sensitivity rough-adjustment compensation circuit is configured to change the amplification factor by changing a resistance value of a rough-adjustment variable resistor to be connected; and the resistance value of the rough-adjustment variable resistor is variable due to connections between multiple rough-adjustment resistors being switched by multiple switches and a combined resistance value of the multiple rough-adjustment resistors being changed.

4. The sensor output compensation circuit according to claim 2, wherein the temperature coefficient sensitivity compensation circuit includes a temperature coefficient sensitivity fine-adjustment compensation circuit to generate a minute-compensation bias voltage to cancel a variation in the sensitivity of the sensor output remaining after canceling due to the temperature coefficient sensitivity rough-adjustment compensation circuit and to apply the minute-compensation bias voltage to another power terminal of the two power terminals.

5. The sensor output compensation circuit according to claim 4, wherein the temperature coefficient sensitivity fine-adjustment compensation circuit includes an amplifier circuit to adjust a magnitude of the minute-compensation bias voltage;

the amplifier circuit is configured to change the amplification factor by changing a resistance value of a fine-adjustment variable resistor to be connected; and the resistance value of the fine-adjustment variable resistor is variable due to connections between multiple fine-adjustment resistors being switched by multiple switches and a combined resistance value of the multiple fine-adjustment resistors being changed.

6. The sensor output compensation circuit according to claim 1, wherein the sensor element is a TMR element.

7. The sensor output compensation circuit according to claim 1, wherein the differential amplifier circuit includes an instrumentation amplifier and a compensation amplifier circuit to adjust an output of the differential amplifier circuit.

8. The sensor output compensation circuit according to claim 7, wherein the differential amplifier circuit includes operational amplifiers to amplify the detection circuits.

9. The sensor output compensation circuit according to claim 1, further comprising a linearity compensation circuit to adjust linearity of the sensor output.

10. The sensor output compensation circuit according to claim 1, further comprising a temperature-characteristic-of-offset compensation circuit to adjust temperature characteristics of an offset voltage of the sensor output.

11. The sensor output compensation circuit according to claim 10, wherein the temperature-characteristic-of-offset compensation circuit includes a first inverting amplifier circuit and a second inverting amplifier circuit including an operational amplifier, a first switch, and a second switch.

12. The sensor output compensation circuit according to claim 1, further comprising a regulator circuit, a reference voltage circuit, and a temperature sensor circuit.

13. A sensor output compensation circuit comprising:

a differential amplifier circuit to amplify, as a sensor output, a differential voltage between detection voltages measured in two detection signal output terminals of a sensor including a sensor element that has a resistance value that changes depending on a detected physical quantity and that is connected by bridge connection;

a temperature sensor circuit to detect an ambient temperature; and a temperature coefficient sensitivity compensation circuit to apply, to two power terminals of the sensor, a bias voltage to cancel a variation in a sensitivity of the sensor output as the ambient temperature changes, based on the ambient temperature that is detected by the temperature sensor circuit; wherein the temperature coefficient sensitivity compensation circuit includes a temperature coefficient sensitivity rough-adjustment compensation circuit to receive a voltage conversion temperature that is outputted as a voltage from the temperature sensor circuit depending on the ambient temperature, to perform inverting amplification of the voltage conversion temperature with an amplification factor corresponding to a change ratio of the sensitivity of the sensor output to the ambient temperature, to generate the bias voltage, and to apply the bias voltage to one of the two power terminals.

14. The sensor output compensation circuit according to claim 13, wherein the temperature coefficient sensitivity rough-adjustment compensation circuit is configured to change the amplification factor by changing a resistance value of a rough-adjustment variable resistor to be connected; and the resistance value of the rough-adjustment variable resistor is variable due to connections between multiple rough-adjustment resistors being switched by multiple switches and a combined resistance value of the multiple rough-adjustment resistors being changed.

15. The sensor output compensation circuit according to claim 13, wherein the temperature coefficient sensitivity compensation circuit includes a temperature coefficient sensitivity fine-adjustment compensation circuit to generate a minute-compensation bias voltage to cancel a variation in the sensitivity of the sensor output remaining after canceling due to the temperature coefficient sensitivity rough-adjustment compensation circuit and to apply the minute-compensation bias voltage to another power terminal of the two power terminals.

16. The sensor output compensation circuit according to claim 15, wherein the temperature coefficient sensitivity fine-adjustment compensation circuit includes an amplifier circuit to adjust a magnitude of the minute-compensation bias voltage;

the amplifier circuit is configured to change the amplification factor by changing a resistance value of a fine-adjustment variable resistor to be connected; and the resistance value of the fine-adjustment variable resistor is variable due to connections between multiple fine-adjustment resistors being switched by multiple switches and a combined resistance value of the multiple fine-adjustment resistors being changed.

17. A sensor output compensation circuit comprising:

a differential amplifier circuit to amplify, as a sensor output, a differential voltage between detection voltages measured in two detection signal output terminals of a sensor including a sensor element that has a resistance value that changes depending on a detected physical quantity and that is connected by bridge connection;

a temperature sensor circuit to detect an ambient temperature;

a temperature coefficient sensitivity compensation circuit to apply, to two power terminals of the sensor, a bias voltage to cancel a variation in a sensitivity of the sensor output as the ambient temperature changes, based on the ambient temperature that is detected by the temperature sensor circuit; and a temperature-characteristic-of-offset compensation circuit to adjust temperature characteristics of an offset voltage of the sensor output; wherein the temperature-characteristic-of-offset compensation circuit includes a first inverting amplifier circuit and a second inverting amplifier circuit including an operational amplifier, a first switch, and a second switch.

* * * * *